United States Patent [19]
Deimel et al.

[11] Patent Number: 6,116,301
[45] Date of Patent: Sep. 12, 2000

[54] LUBRICANT STORAGE ASSEMBLY FOR A LUBRICANT DELIVERY UNIT

[75] Inventors: Thomas Deimel, Essen; Karl Sachs, Bottrop, both of Germany

[73] Assignee: Krupp Berco Bautechnik GmbH, Essen, Germany

[21] Appl. No.: 09/246,142

[22] Filed: Feb. 8, 1999

[30] Foreign Application Priority Data

Feb. 7, 1998 [DE] Germany ................ 198 05 007

[51] Int. Cl.$^7$ .................................................. B65B 1/04
[52] U.S. Cl. ........................ 141/383; 141/384; 285/40
[58] Field of Search .................................... 141/383, 384, 141/385, 386, 18; 285/40

[56] References Cited

U.S. PATENT DOCUMENTS

| | | |
|---|---|---|
| 2,012,843 | 8/1935 | Wilkes . |
| 2,680,496 | 6/1954 | Johnson . |
| 4,488,738 | 12/1984 | Valdes . |
| 5,060,761 | 10/1991 | Arndt et al. . |

FOREIGN PATENT DOCUMENTS

| | | |
|---|---|---|
| 0 678 342 | 10/1995 | European Pat. Off. . |
| 1 486 663 | 6/1969 | Germany . |
| 24 58 116 | 6/1975 | Germany . |

OTHER PUBLICATIONS

DIN 7500, Oct. 1978, pp. 1–6.

*Primary Examiner*—Steven O. Douglas
*Attorney, Agent, or Firm*—Venable; Gabor J. Kelemen

[57] ABSTRACT

A lubricant storage assembly for supplying a lubricant delivery unit with lubricant includes a socket adapted to be affixed to the lubricant delivery unit and having an inner wall face; a thread-cutting threaded portion provided in the inner wall face; a socket inlet opening; and a holding guide portion. The assembly further includes a lubricant container having an outer wall face; a head portion situated beyond said outer wall face; and an engagement length portion provided on the outer wall face. The engagement length portion of the container is cut by the thread-cutting threaded portion upon introducing the lubricant container into the socket and upon turning the lubricant container relative to the socket about the longitudinal container axis. The engagement length portion is of a material which has a lesser hardness than the material of the thread-cutting threaded portion.

8 Claims, 2 Drawing Sheets

LUBRICANT STORAGE ASSEMBLY FOR A LUBRICANT DELIVERY UNIT

CROSS REFERENCE TO RELATED APPLICATION

This application claims the priority of German Application No. 198 05 007.0 filed Feb. 7, 1998, which is incorporated herein by reference.

BACKGROUND OF THE INVENTION

This invention relates to a lubricant storage assembly and is concerned more specifically with a device for securing a lubricant container to a lubricant delivery unit, particularly for use in construction machines such as hydraulically operated hammers and breaker jaws. The device includes a container-receiving socket which is secured to the machine and which has a holding portion which guides and receives a supported portion (head portion) of the lubricant container upon its introduction into the socket.

Lubricating systems formed of a lubricant delivery unit and a lubricant container primarily serve the purpose to grease highly stressed supporting or bearing locations of hydraulically operated hammers or breaker jaws. The lubricating greases may have a very high solid lubricant content such as cutter paste. The lubricant delivery unit, which in the simplest case has a delivery piston axially movable in a delivery chamber, may be of arbitrary design, as long as it is adapted to receive the lubricant stored in the lubricant container and to advance it in the direction of the machine area to be lubricated.

A securing device of the above outlined type is described in U.S. Pat. No. 5,060,761, according to which the lubricant delivery unit is coupled with the cutter (chisel) guide of a hydraulically operated percussion mechanism and has a container-receiving socket. The lubricant container is supported by the socket in a releasable manner by a holding portion provided with an inner thread.

Particularly when using lubricant containers which are made of a soft and relatively low-resistance material such as a plastic, risks are significant that the lubricant container, in response to abrupt motions of the lubricant delivery unit jams in the socket and/or is damaged by an impermissibly large force applied during its insertion into the socket. Consideration has to be given to the circumstance that the lubricant delivery unit, because of the viscosity of the lubricant, is arranged close to the machine (for example, on the hydraulically operated percussion mechanism itself) and is thus exposed to forces, such as shocks and vibrations derived from the operation of the machine.

SUMMARY OF THE INVENTION

It is an object of the invention to provide an improved securing device of the above outlined type which, in the region of the lubricant container, has properties which better resist interfering effects derived particularly from the operation of the machine served by the lubricant delivery unit. It is a particular object of the invention to so design the securing device that lubricant containers of relatively soft and yielding material may also be securely used.

These objects and others to become apparent as the specification progresses, are accomplished by the invention, according to which, briefly stated, the lubricant storage assembly for supplying a lubricant delivery unit with lubricant includes a socket adapted to be affixed to the lubricant delivery unit and having an inner wall face; a thread-cutting threaded portion provided in the inner wall face; and a holding guide portion. The assembly further includes a lubricant container having an outer wall face; and an engagement length portion provided on the outer wall face. The engagement length portion of the container is cut by the thread-cutting threaded portion upon introducing the lubricant container into the socket and upon turning the lubricant container relative to the socket about the longitudinal container axis. The engagement length portion is of a material whose hardness is less than that of the material of the thread-cutting threaded portion. The container further has a supported portion (head portion) received and guided by the holding portion of the socket upon introducing the lubricant container into the socket for releasably holding the lubricant container in the socket.

The invention is based on the principle to provide the container-receiving socket with a thread-cutting threaded portion externally of the region of the conventional holding portion of the socket. The engagement length portion provided on the outer face of the lubricant container and the thread-cutting threaded portion provided on the inner face of the socket are so dimensioned with respect to one another that as the lubricant container is inserted in the direction of the lubricant delivery unit, eventually a significantly higher resistance to the winding torque is reached when the lubricant container assumes its operating position in the socket.

By virtue of the thread-cutting threaded portion the engagement length portion of the lubricant container extending into the thread-cutting threaded portion automatically assumes the configuration required for that particular use. By utilizing the invention, simply configured lubricant containers, thus particularly those having cylindrical engagement length portions, may be used, provided that they have a sufficient wall thickness in the region of the engagement length portion.

Since the engagement length portion of the lubricant container receives its final configuration only upon its introduction into the socket, the connection which is established remains securely tight, that is, it resists shocks and vibratory motions which appear particularly during operation of percussion tools or breaker jaws.

The thread diameter of the thread-cutting threaded portion and the outer diameter of the engagement length portion are, as viewed in the direction of insertion of the lubricant container into the socket, coordinated with one another in such a manner that as the lubricant container is screwed into the socket, the resistance to the winding torque progressively increases. In view of the function and the effect of the thread-cutting threaded portion, the socket wall, or at least the thread-cutting threaded portion is of a harder material than that of the engagement length portion of the lubricant container.

The thread-cutting threaded portion and the outer diameter of the engagement length portion may be different as concerns the diametrical course, while observing the earlier noted conditions according to the invention.

In particular, the thread diameter of the thread-cutting threaded portion may decrease in the direction of container insertion, in which case the beginning of the thread-cutting threaded portion has a maximum thread diameter which is greater than the outer diameter of the engagement length portion which may be cylindrical.

The invention may essentially also be implemented by providing that the thread diameter of the thread-cutting threaded portion and/or the outer diameter of the lubricant container decrease in the direction of container insertion and may be throughout or partially arcuately bent.

According to a particularly simple embodiment of the invention the diameter of the thread-cutting threaded portion, as viewed in an axial section, decreases in the direction of container insertion. As concerns the configuration of the thread-cutting threaded portion, it is essential that the resistance to the winding torque does not attain an impermissibly high value before the lubricant container has reached its predetermined operational position relative to the lubricant delivery unit. Stated differently, the thread-cutting threaded portion has to be adapted to the shape of the engagement length portion in such a manner that the lubricant container, upon threading it into place into the socket, is not exposed to excessive stresses which could cause damage thereof.

According to a further feature of the invention, the container-receiving socket is provided with at least one sealing element which is positioned in front of the thread-cutting threaded portion as viewed in the direction of container insertion. The sealing element serves not only to supply an additional support for the lubricating container; it also serves to wipe dirt from the outer circumferential surface of the lubricant container and to protect the thread-cutting threaded portion as well as the holding portion from the environment. Further, the arrangement having at least one sealing element contributes to the dampening of jars and vibrational shocks between the socket and the lubricant container.

The holding portion of the socket is, relative to the thread-cutting threaded portion, arranged such that the lubricant container, upon its introduction into the socket, is guided by the holding portion of the socket, before the engagement length portion of the container reaches the thread-cutting threaded portion. For this purpose the lubricant container is, on its leading side, provided with a holding head which projects beyond and is longer than the engagement length portion on the lateral face of the container. By virtue of such an arrangement the holding head (supported portion) of the container is supported at an early moment in a guiding (holding) portion of the socket and thus determines the position of the lubricant container relative to the socket before the thread-cutting threaded portion becomes effective.

In accordance with a further feature of the invention, the holding head of the lubricant container and the guide portion (holding portion) of the socket have respective threads cooperating with one another, so that in its operational (working) position the lubricant container is, at its leading end, threadedly attached to the socket. Thus, under the effect of the coupling thread, the engagement length portion of the lubricant container may be threaded in a guided and gentle manner into the thread-cutting threaded portion of the socket. The arrangement reduces the risks that the engagement length portion is damaged upon repeated insertions and removals. The coupling threads of the head portion of the container and the guide portion of the socket have the same pitch as the thread-cutting threaded portion.

DESCRIPTION OF THE PREFERRED EMBODIMENT

Figure 1:
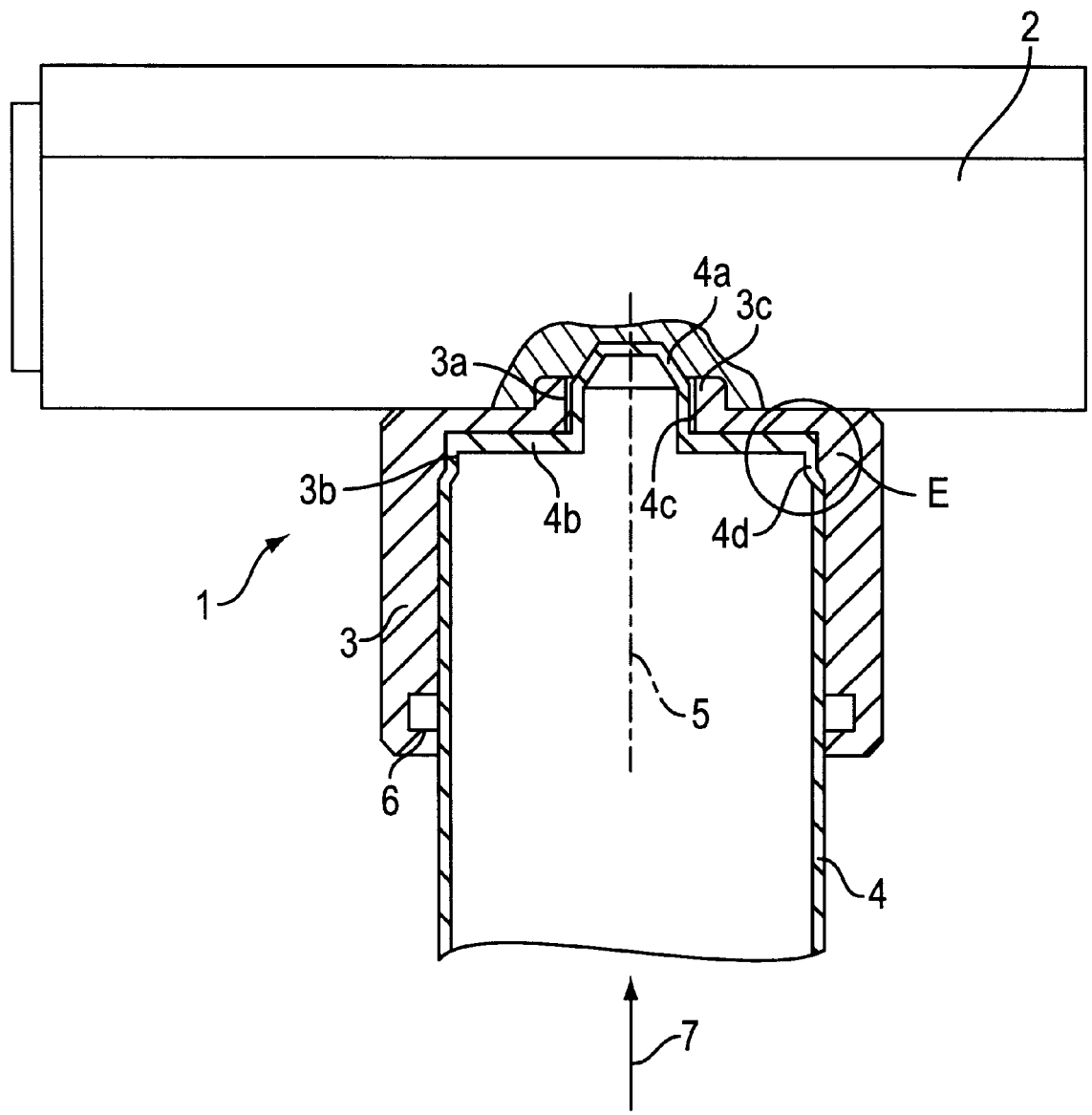
FIG. 1 is a schematic axial sectional view of a lubricant container and a container-receiving socket according to a preferred embodiment of the invention, shown in a working position.

Turning to FIG. 1, the lubricating device generally designated at 1 has, as its main components, a lubricant delivery unit 2 designed in principle as an axial piston pump, a container-receiving socket 3 affixed to the unit 2 and a plastic lubricant container 4 screwed into the socket 3. The lubricant container 4 is, at its side oriented towards the lubricant delivery unit 2, coupled by means of a holding head 4a to the non-illustrated delivery chamber of the lubricant delivery unit 2. The frontal terminal portion of the holding head 4a projects beyond the socket 3. The longitudinal axis 5 of the container-receiving socket 3 coincides with the longitudinal axis of the lubricant container 4.

The holding head 4a projects axially beyond a radial end face 4b of the lubricant container 4 and is provided with an external coupling thread 4c which meshes with an internal thread 3a provided in a guiding portion 3c of the socket 3.

As viewed in the axial direction 7 in which the lubricant container 4 is introduced into the socket 3, in front of the coupling thread 3a the inner surface of the socket 3 is provided with a thread-cutting threaded portion 3b which, as the container 4 is axially turned while being introduced into the socket 3, cuts a thread and thus threadedly engages an engagement length portion 4d of the lubricant container 4. The engagement length portion 4d is situated in the vicinity of the radial end wall 4b, in front of the holding head 4a.

As viewed in the direction of the arrow 7, within the socket 3, in front of the thread-cutting threaded portion 3b, a sealing ring 6 is provided which circumferentially yieldingly engages the outer surface of the lubricant container 4.

As further shown in FIG. 1, the coupling threads 3a and 4c are arranged relative to the thread-cutting threaded portion 3b in such a manner and are of such a configuration that when introducing the lubricant container 4 into the container-receiving socket 3 in the direction of the arrow 7, the coupling threads 3a, 4c arrive in engagement with one another before the engagement length portion 4d reaches the thread-cutting threaded portion 3b and is threaded thereinto.

Figure 2A:
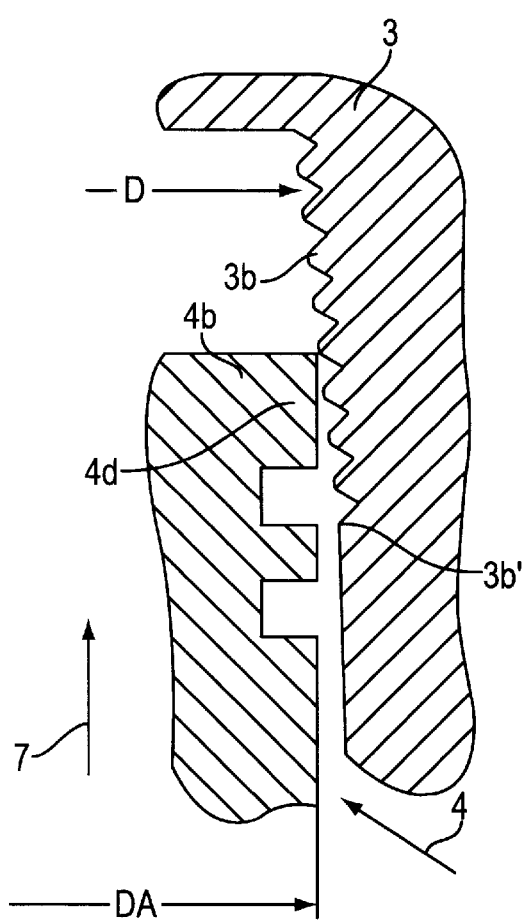
FIG. 2a is an enlarged sectional view of a part (inset E) of the structure shown in FIG. 1, depicted prior to starting a self threading insertion of the lubricant container into the socket.

FIG. 2a illustrates the position of a new, not-yet used lubricant container 4 relative to the socket 3 after a connection has already been established between the coupling threads 3a and 4c (shown in FIG. 1 but not shown in FIG. 2a). The engagement length portion 4d is not yet cut by the thread-cutting threaded portion 3b and it therefore still has its original cylindrical shape.

The thread-cutting threaded portion 3b has a diameter D which linearly decreases as viewed in the direction of the arrow 7, that is, in the direction of introduction of the lubricant container 4 into its socket 3. The diameter of the thread-cutting threaded portion 3b is, in its starting zone 3b', greater than the outer diameter DA of the engagement length portion 4d projecting into the thread-cutting threaded portion 3b.

Figure 2B:
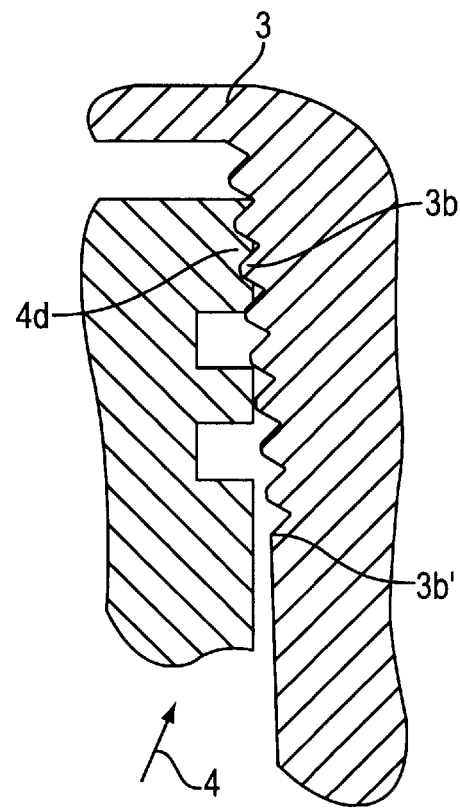
FIG. 2b is a view similar to FIG. 2a, showing the lubricant container in a near-working position in which a thread has already been cut into the container by the socket.

As the lubricant container 4 is, from its position shown in FIG. 2a, further threaded to advance in the direction of the arrow 7, the thread-cutting threaded portion 3b starts cutting into the engagement length portion 4d such that an external thread is formed on the engagement length portion 4*d* as illustrated in FIG. 2*b*. In this manner between the socket 3 and the lubricant container 4 additionally a screw connection with a precise fit is obtained which prevents undesired loosening of the lubricant container 4 under the effect of jars or vibratory shocks during the operation of the tool with which the lubricant delivery system is associated.

The course of the diameter D of the thread-cutting threaded portion 3*b* is selected such that the lubricant container 4 may assume its operational position relative to the socket 3 without impermissibly high stresses. The socket 3 is, at least in the region along which the thread-cutting threaded portion 3*b* extends, made of a material (metal) that is harder than the material (plastic) of the lubricant container 4. The metal material should be such that it has sufficient gliding properties as it cooperates with the plastic lubricant container 4.

As an alternative, it is feasible to so construct the lubricant container 4 that its material is softer than the thread-cutting threaded portion 3*b* of the socket 3 only in the region of the engagement length portion 4*d*.

After the deformation of the engagement length portion 4*d* by the thread-cutting threaded portion 3*b* the lubricant container 4 may be reused, that is, after unscrewing and removing it from the socket 3 it may be charged with lubricant and screwed back into the socket 3. In such a reuse the introduction into the socket is facilitated by guiding the holding head 4*a*, particularly by the interengaging threads 3*a* and 4*c*. During repeated introduction of the lubricant container 4 into the socket 3, such a guidance also reduces the risks of premature damage to the outer thread which was previously cut into the engagement length portion 4*d* of the lubricant container 4.

The advantage of the invention resides particularly in that without any previous additional machining a lubricant container of simple construction may be securely coupled with the socket by providing, by thread cutting, a sole or an additional screw connection. A damaging of the lubricant container during installation or during operation and thus a breakdown of the lubricant delivery unit is therefore substantially prevented.

It will be understood that the above description of the present invention is susceptible to various modifications, changes and adaptations, and the same are intended to be comprehended within the meaning and range of equivalents of the appended claims.

What is claimed is:

1. A lubricant storage assembly for supplying a lubricant delivery unit with lubricant; said lubricant storage assembly comprising
   (a) a socket adapted to be affixed to the lubricant delivery unit; said socket having
      (1) an inner wall face;
      (2) a thread-cutting threaded portion provided in said inner wall face; said thread-cutting threaded portion being of a first material; and
      (3) a holding guide portion; and
   (b) a lubricant container having
      (1) a longitudinal axis;
      (2) an outer wall face;
      (3) an engagement length portion provided on said outer wall face; said engagement length portion being cut by said thread-cutting threaded portion upon introduction of said lubricant container into said socket and upon turning said lubricant container relative to said socket about said longitudinal axis; said engagement length portion being of a second material; said second material having a lesser hardness than said first material; and
      (4) a head portion situated beyond said outer wall face; said head portion being received and guided by said holding portion of said socket upon introduction of said lubricant container into said socket for releasably holding said lubricant container in said socket.

2. The lubricant storage assembly as defined in claim 1, further comprising a circumferential sealing element held in said socket at a location ahead of said thread-cutting threaded portion as viewed in an axial direction of insertion of said lubricant container into said socket.

3. The lubricant storage assembly as defined in claim 1, wherein said head portion of said lubricant container is situated axially beyond said engagement length portion as viewed in an axial direction of insertion of said lubricant container into said socket.

4. The lubricant storage assembly as defined in claim 3, wherein said holding portion of said socket and said head portion of said lubricant container are in a threaded engagement in an installed, operational position of said lubricant container in said socket.

5. The lubricant storage assembly as defined in claim 3, wherein an axial distance between said head portion of said lubricant container and said thread-cutting threaded portion of said socket is dimensioned such that during introduction of said lubricant container into said socket, said head portion of said lubricant container is received and guided by said holding portion of said socket before said thread-cutting threaded portion of said socket enters into engagement with said engagement length portion of said lubricant container.

6. The lubricant storage assembly as defined in claim 1, further comprising resistant-increasing means for gradually increasing a resistance to a winding torque upon introduction of said lubricant container into said socket.

7. The lubricant storage assembly as defined in claim 6, wherein said thread-cutting threaded portion has a thread diameter and said engagement length portion has an outer diameter; further wherein said resistant-increasing means comprises a decrease of said thread diameter from a starting region of said thread-cutting threaded portion as viewed in an axial direction of insertion of said lubricant container into said socket.

8. The lubricant storage assembly as defined in claim 7, wherein said decrease is linear.

\* \* \* \* \*